Jan. 17, 1967  H. F. HEISLER  3,298,662
HYDRAULIC DEVICE
Filed May 28, 1964  2 Sheets-Sheet 1
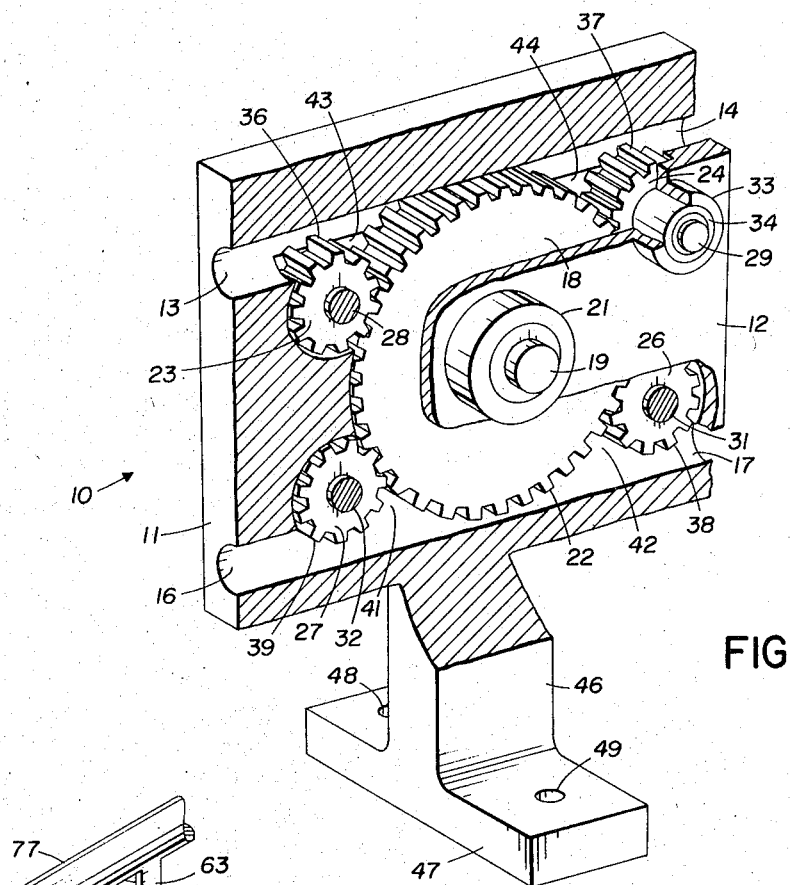
FIG 1
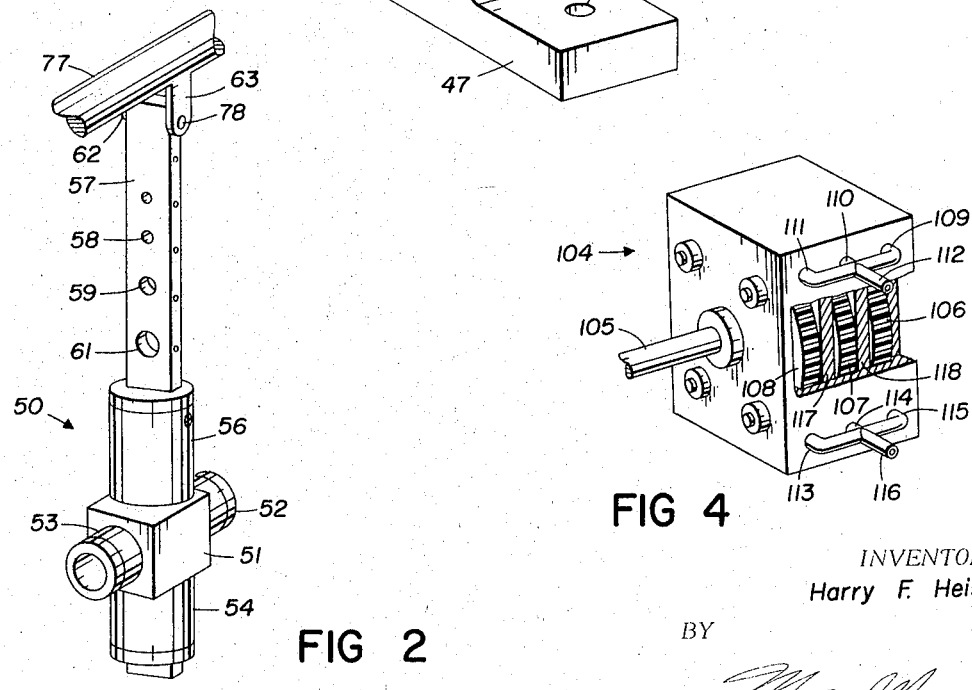
FIG 2
FIG 4
INVENTOR.
Harry F. Heisler
BY
Mary Moody
Attorney United States Patent Office 3,298,662
Patented Jan. 17, 1967

3,298,662
HYDRAULIC DEVICE
Harry Frederick Heisler, 1001 Prospect Blvd.,
Waterloo, Iowa 50701
Filed May 28, 1964, Ser. No. 370,777
5 Claims. (Cl. 253—23)

This invention relates in general to hydraulic devices and, in particular, to a hydraulic motor or pump.

It is an object of this invention to provide a highly efficient device for converting mechanical enery to hydraulic energy or hydraulic energy to mechanical energy.

Yet another object is to provide an improved hydraulic motor which has high efficiency.

Still another object of this invention is to provide an improved hydraulic pump which has high efficiency.

Another object is to provide a throttle for a hydraulic device.

A feature of this invention is found in the provision for a housing containing a main pump gear and four small gears in mesh therewith so as to provide an improved hydraulic device.

Further objects, features and advantages will become apparent from the following description and claims when read in view of the drawings, in which:

FIGURE 1 is a partially cut-away perspective view of the hydraulic device according to this invention;

FIGURE 2 illustrates a throttle device;

FIGURE 4 illustrates a modification of this invention.

Figure 3:
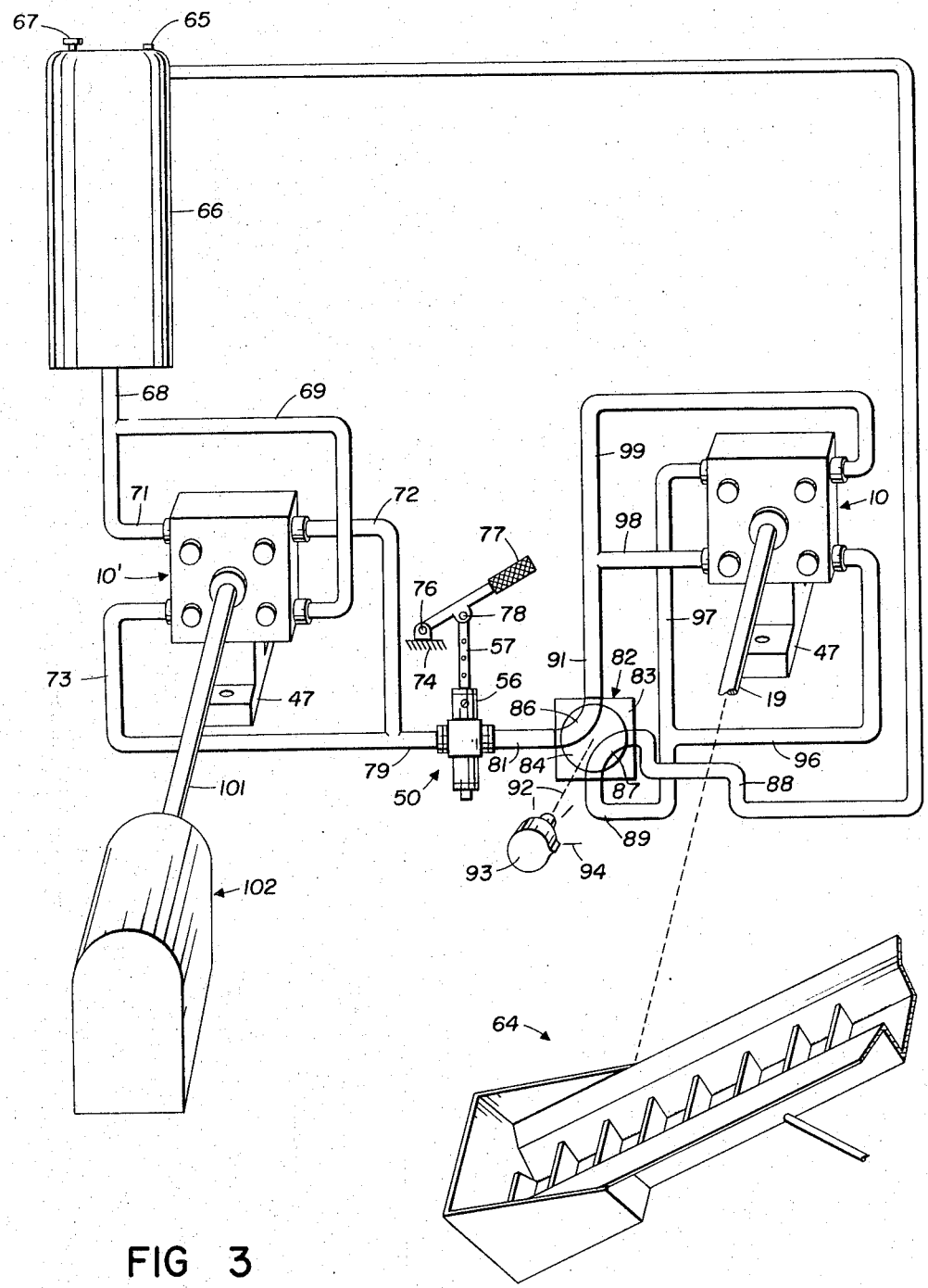
FIGURE 3 illustrates a complete system of the invention.

FIGURE 1 illustrates a hydraulic device 10 of high efficiency which may be used as a motor or pump. It comprises a housing that has sides 11 and 12. Most of side 12 has been cut-away in FIGURE 1 for clarity of the internal detail.

A pair of openings are formed in sides 11 and 12. The first openings has ends 13 and 14 and the second opening has ends 16 and 17.

A main turbine gear 18 is fixed to shaft 19 which extends through the sides 11 and 12. Shaft 19 is supported by sides 11 and 12 by suitable bearings 21.

Four slinger gears 23, 24, 26 and 27 are substantially smaller than main turbine gear 18 and are in mesh with the larger gear. Gears 23, 24, 26 and 27 are attached to shafts 28, 29, 31 and 32 which are supported in suitable bearings 33–34 from sides 11 and 12.

Gear 23 has teeth 36 which mesh with teeth 22 of gear 18.

Likewise gears 24, 26 and 27 have teeth 37, 38 and 39 respectively, which mesh with teeth 22 of gear 18.

Gear 23 is mounted in end 13 of the first opening so that a portion of its teeth are in the opening. Material has been removed at point 43 between gears 18 and 23. Gear 24 is mounted in end 14 of the first opening and material has been removed from sides 11 and 12 at point 44 between gears 18 and 24.

Gear 27 is mounted in end 16 of the second opening and material has been removed at point 41 between gears 18 and 27. Gear 26 is mounted in end 17 of the second opening and material has been removed at point 42 between gears 18 and 26.

A supporting bracket 46 is formed with a flange 47 which has openings 48 and 49 for receiving suitable holding bolts therein. The bracket 46 is attached to sides 11 and 12. Sides 11 and 12 are suitably attached together by welding or bolts after the gears 18, 23, 24, 26 and 27 are installed.

FIGURE 3 illustrates a pair of hydraulic devices 10 and 10' in practical operation in a system.

Unit 10 operates as a reversible motor and unit 10' as a pump.

A prime mover 102, which might be a gasoline engine, for example, has its output shaft 101 attached to the shaft of main turbine gear 18 of pump unit 10'. A reservoir 66 has its supply line 68 connected to two lines 69 and 71 that are connected to ends 13 and 17 of the pump. A high pressure line 79 has two branches 72 and 73 which are connected to ends 14 and 16 of the pump unit.

A throttle unit 50 is connected in the high pressure line between sections 79 and 81. A reversing valve 82 receives the output from line 81. Valve 82 has a case 83 and four ports. Line 81 is attached to one port and lines 88, 89 and 91 are connected to the other ports. A movable portion of valve 82 has a first L-shaped passage 86 and a second L-shaped passage 87. A shaft 92 is attached to the movable portion and carries a knob 93 that may be read against indicia 94.

Line 88 is a return line to reservoir 66. Line 89 has two branches 96 and 97 which connect, respectively to ends 17 and 13 of motor 10. Line 91 has two branches 98 and 99 which are connected respectively, to ends 16 and 14 of motor 10. Valve 82 allows high pressure fluid to be supplied to motor 10. It also allows the motor to be reversed. When passage 86 connects line 81 to line 91 and passage 87 connects line 89 with line 88, the motor will run counterclockwise relative to FIGURES 1 and 3. However, knob 93 may be rotated so that line 81 may be connected to line 89 and line 91 may be connected to line 88 and this causes motor 10 to rotate clockwise relative to FIGURES 1 and 3. The valve 82 is shown schematically rather than in actual detail since such reversing valves are well known to those skilled in the art.

The output shaft 19 of motor 10 is connected to a driven device 64, which could be, by way of example, an elevator.

The throttle 50 is shown in detail in FIGURE 2 and comprises a housing 51 on opposites of which input port 53 and output port 52 are mounted. Input port 53 is connected to line 79 and output port 52 is connected to line 81. A slide bar 57 passes through extensions 54 and 56 and is formed with openings 58, 59 and 61 of varying sizes. A handle 77 has brackets 62 and 63 which are attached to the end of bar 57 by pin 78. As shown in FIGURE 3 the handle 77 is supported by pivot pin 76 from fixed bracket 74.

By moving the bar 57 different size holes 57–61 can be aligned between the input and output of the ports 53 and 52 to vary the flow through the device. The bar may be suitably detented to hold it at any preset position. Thus, the amount of fluid through the device may be controlled as desired.

FIGURE 1 illustrates the key operating features of the invention which will be described as a motor. Assume that high pressure fluid is connected to ends 13 and 17 and that ends 14 and 16 are outlet ports.

High pressure fluid will engage teeth 22 of turbine gear 18 to drive it clockwise relative to FIGURE 1. Gears 23, 24, 26 and 27 will turn counterclockwise because they are in mesh with the turbine gear. Due to the meshing of the small gears with the large gear, fluid will not go around the turbine gear the wrong way because such passage is blocked by the meshing gear teeth. The gears 23, 24, 26 and 27 will turn against the flow of fluid but they have fewer teeth than the main turbine gear 18 so the device operates efficiently. The gears 23, 24, 26 and 27 sling the fluid toward the effective turbine teeth to increase the efficiency. To reverse the direction of rotation, ends 16 and 14 become inlet ports of high pressure fluid and ends 13 and 17 become discharge ports. This drives turbine gear 18 counterclockwise and slinger gears 23, 24, 26 and 27 clockwise.

To operate as a pump shaft 19 is driven by a prime mover and the turbine gear produces high pressure fluid at two output ports. The other ports serve as the input ports.

The throttle 50 may be integrally formed with the housing 11 of the hydraulic device. The throttle is a volume control device which varies the volume of fluid through the apparatus.

Hydraulic motors such as described could be mounted on each rear wheel of small tractors to drive them.

FIGURE 4 illustrates a modification which shows three hydraulic units mounted on a single shaft. A housing 104 has an output shaft 105 upon which are mounted turbine gears 106, 107 and 108. Partitions 117 and 118 separate the turbine gears. An input pipe 112 has three branches 109, 110 and 111 which respectively supply driving fluid to gears 106, 107 and 108 and are joined at output pipe 116. Conduits on the back of housing 104 not shown join pipes 109 and 115, 110 and 114, and 111 and 113, respectively, to complete the flow. The splasher gears are not shown but are similar to those shown in FIGURE 1. This structure gives three times the power at shaft 105 as is available from a single unit with a turbine gear the same size as gear 106.

It is seen that this invention provides an improved hydraulic system which can function as a motor or a pump. Although it has been described with respect to a preferred embodiment it is not to be so limited as changes and modifications may be made which are within the full intended scope as defined by the appended claims.

I claim:
1. A hydraulic device comprising a housing, a main turbine gear supported by the housing, a first passage through the housing and in communication with the periphery of the turbine gear, a first pair of slinger gears about one third the diameter of the turbine gear rotatably supported by the housing and with their teeth in mesh with the turbine gear and mounted partially within the first passage on either side of the turbine gear, a second passage through the housing and in communication with the periphery of the turbine gear, a second pair of slinger gears about one third the diameter of the turbine gear rotatably supported by the housing and with their teeth in mesh with the turbine gear and mounted partially within the second passage on either side of the turbine gear.

2. In apparatus according to claim 1 an output shaft connected to the turbine gear to provide a mechanical coupling for the hydraulic device.

3. In apparatus according to claim 2 a supply of hydraulic fluid connected to the passages of the housing, and a throttle connected in the supply line.

4. In apparatus according to claim 3 wherein said throttle includes an input port and an output port and with a slide bar movably mounted between said ports and formed with a number of openings of different size to vary the flow between the input and output ports.

5. In apparatus according to claim 4, means for moving the slide bar.

References Cited by the Examiner

UNITED STATES PATENTS

| | | | |
|---|---|---|---|
| 23,267 | 3/1859 | Roots | 103—125 |
| 508,574 | 11/1893 | Lambing | 103—125 |

FOREIGN PATENTS

| | | |
|---|---|---|
| 207,037 | 1/1955 | Australia. |
| 1,183,654 | 1/1959 | France. |
| 852,041 | 10/1952 | Germany. |

MARTIN P. SCHWADRON, *Primary Examiner.*

E. A. POWELL, *Assistant Examiner.*